United States Patent
Ma

(10) Patent No.: US 9,547,904 B2
(45) Date of Patent: Jan. 17, 2017

(54) CROSS SPECTRAL FEATURE CORRELATION FOR NAVIGATIONAL ADJUSTMENT

(71) Applicant: Yunqian Ma, Oak Park, CA (US)

(72) Inventor: Yunqian Ma, Oak Park, CA (US)

(73) Assignee: Northrop Grumman Systems Corporation, Falls Church, OH (US)

( * ) Notice: Subject to any disclaimer, the term of this patent is extended or adjusted under 35 U.S.C. 154(b) by 24 days.

(21) Appl. No.: 14/725,964

(22) Filed: May 29, 2015

(65) Prior Publication Data

US 2016/0350927 A1    Dec. 1, 2016

(51) Int. Cl.
| | |
|---|---|
| *G06K 9/00* | (2006.01) |
| *G06T 7/00* | (2006.01) |
| *G06T 5/00* | (2006.01) |
| *G06T 5/20* | (2006.01) |
| *G06K 9/46* | (2006.01) |
| *G01C 21/26* | (2006.01) |

(52) U.S. Cl.
CPC ............ *G06T 7/0044* (2013.01); *G01C 21/26* (2013.01); *G06K 9/4604* (2013.01); *G06T 5/002* (2013.01); *G06T 5/20* (2013.01); *G06T 7/003* (2013.01); *G06T 7/0026* (2013.01); *G06T 2207/10048* (2013.01); *G06T 2207/20024* (2013.01); *G06T 2207/20048* (2013.01); *G06T 2207/20072* (2013.01); *G06T 2207/20182* (2013.01)

(58) Field of Classification Search
CPC .... B60R 1/00; G06T 2207/10016; G08G 1/16
USPC ........................................................ 382/104
See application file for complete search history.

(56) References Cited

U.S. PATENT DOCUMENTS

| | | | | |
|---|---|---|---|---|
| 2008/0079960 A1* | 4/2008 | Yamazaki | .............. | B41J 29/393 358/1.8 |
| 2013/0077887 A1* | 3/2013 | Elton | .................... | G06T 3/4053 382/264 |

(Continued)

FOREIGN PATENT DOCUMENTS

EP        2687817 A2       1/2014

OTHER PUBLICATIONS

Duraiswami, Ramani. "Lecture 4: Image Features." Feb. 2005. PowerPoint Presentation.

(Continued)

*Primary Examiner* — Gregory F Cunningham
(74) *Attorney, Agent, or Firm* — Tarolli, Sundheim, Covell & Tummino LLP

(57) ABSTRACT

A system includes a sensor to generate a first image having a first two-dimensional image pixel data set. A database provides a second image having a second two-dimensional image pixel data set that includes a three-dimensional positional data set describing a navigational position of each pixel in the second two-dimensional image pixel data set. A vision module includes an edge extractor to extract image edge features from the first two-dimensional pixel data set and image edge features from the second two-dimensional image pixel data set. The vision module includes a feature correlator to determine a navigational position for each pixel in the first two-dimensional data set based on an image edge feature comparison of the extracted edge features from the first and second two-dimensional image pixel data sets.

20 Claims, 7 Drawing Sheets

(56) References Cited

U.S. PATENT DOCUMENTS

2013/0131978 A1* 5/2013 Han ................ G01C 21/3638
701/436
2013/0236054 A1    9/2013 Carmichael et al.
2013/0250123 A1    9/2013 Zhang et al.
2014/0153788 A1    6/2014 Ma et al.

OTHER PUBLICATIONS

Fermüller, et al.: "Edge Detection Slides from", Jun. 19, 2012, XP055306266, retrieved from the internet: URL: https://web.archive.org/web/20120619133601/http://www.ics.uci.edu/~majumder/IDP/classes/EdgeDetect.pdf [retrieved on Sep. 28, 2016]; *the whole document*.
Morse: "Lecture 13: Edge Detection Contents", Brigham Young University Last modified Feb. 12, 2000, XP055306272, retrieved from the internet: URL:http://homepages.inf.ed.ac.uk/rbf/CVonline/LOCAL_COPIES/MORSE/edges.pdf [retrieved on Sep. 28, 2016] *the whole document*.
Partial Search Report for corresponding EP 16 16 9967, mailed Nov. 3, 2016.

* cited by examiner

CROSS SPECTRAL FEATURE CORRELATION FOR NAVIGATIONAL ADJUSTMENT

This invention was made with Government support under Contract No. FA8650-11-C-1045 with the AFRL Wright-Patterson. The Government has certain rights in this invention.

TECHNICAL FIELD

This disclosure relates to navigation systems, and more particularly to a system and method to adjust a navigation system via cross spectral feature correlation between images having different spectral content.

BACKGROUND

An Inertial Navigation System (INS) is employed to a provide navigation solution to guide vehicles such as aircraft and may receive input from an Inertial Measurement Unit (IMU) to generate the navigation solution. The navigation solution includes position, velocity, and attitude for example for vehicle control. A global positioning system can also be employed to correct or calibrate the navigation solution in the INS. Inertial navigation systems usually can provide an accurate solution for a short period of time. For example, INS accelerometers in the IMU produce an unknown bias signal that appears as a genuine specific force. This may be integrated twice and produces an error in position. Additionally, the INS software uses an estimate of the angular position of the accelerometers when conducting this integration. Typically, the angular position is tracked through an integration of the angular rate from the gyroscopic sensors in the IMU. These also can produce unknown biases that affect the integration to generate the position of the unit. The GPS provides an absolute drift-free position value that can be used to reset the INS solution or can be blended with it by use of a mathematical algorithm, such as a Kalman Filter. The angular orientation of the unit can be inferred from the series of position updates from the GPS. The change in the error in position relative to the GPS can be used to estimate the unknown angle error.

The benefits of using GPS with an INS are that the INS may be calibrated by the GPS signals and that the INS can provide position and angle updates at a quicker rate than GPS. For high dynamic vehicles, such as missiles and aircraft, the INS fills in the gaps between GPS positions. Additionally, GPS may lose its signal and the INS can continue to compute the position and angle during the period of lost GPS signal. The two systems are complementary and are often employed together. Even with GPS corrections to the INS, the INS position estimates can still drift with time. In some cases, the drift can account for more than one hundred meters of error in a period of 10 minutes, for example.

SUMMARY

This disclosure relates to a system and method to adjust a navigation system via cross spectral feature correlation between images having different spectral content. In one aspect, a system includes a sensor to generate a first image having a first two-dimensional image pixel data set. A database provides a second image having a second two-dimensional image pixel data set that includes a three-dimensional positional data set describing a navigational position of each pixel in the second two-dimensional image pixel data set. A vision module includes an edge extractor to extract image edge features from the first two-dimensional pixel data set and image edge features from the second two-dimensional image pixel data set. The vision module includes a feature correlator to determine a navigational position for each pixel in the first two-dimensional data set based on an image edge feature comparison of the extracted edge features from the first and second two-dimensional image pixel data sets. The feature correlator assigns a subset of the three-dimensional positional data set from the second image to a subset of correlated features in the first image based on the image edge feature comparison.

In another aspect, a method includes transforming a first image pixel data set to a first image edge domain. The method includes transforming a second image pixel data set to a second image edge domain. Each pixel in the second image pixel data set is associated with three-dimensional position data. The method includes filtering the first and second image edge domains to transform the first and second image edge domains into a first smooth image domain and a second smooth image domain. This includes calculating a histogram for each of the first and second smooth image domains to determine an orientation between the first and second smooth image domains. The method includes computing a distance between the histograms of the oriented edge features of the first and second smooth image domains to determine a navigational position for a subset of pixels in the first image pixel data set based on a correlation to the second image pixel data set in order to extract the three-dimensional position data associated with the second image pixel data set.

In yet another aspect, a non-transitory computer readable medium includes computer executable instructions configured to transform an infrared image pixel data set from a sensor to a first image edge domain. The instructions transform a visual image pixel data set from a database to a second image edge domain. Each pixel in the visual image pixel data set is associated with three-dimensional position data. The instructions filter the first and second image edge domains to transform the first and second image edge domains into a first smooth image domain and a second smooth image domain. The instructions calculate a histogram for each of the first and second smooth image domains to determine an orientation between the first and second smooth image domains. The instructions compute a distance between the histograms of the oriented edge features of the first and second smooth image domains to determine a navigational position for a subset of pixels in the infrared image pixel data set based on a correlation to the visual image pixel data set in order to extract the three-dimensional position data associated with the visual image pixel data set.

DETAILED DESCRIPTION

This disclosure relates to a system and method to adjust a navigation system via cross spectral feature correlation between images having different spectral content. In one aspect, the systems and methods described herein provide cross spectral feature extraction from images having differing spectral content (e.g., infrared versus visible spectrum) and a correlation (e.g., matching) algorithm to extract three-dimensional (3D) information from one image and associate the extracted information with correlated features of another image. The extracted 3D information can then be employed to update and correct the position of a navigation system that may have drifted over time. An imaging system as disclosed herein, including a visible image and an Electrical Optical/Infrared image can capture a picture of the terrain beneath or around a moving vehicle, for example, and compare with a stored imaging database to provide navigation correction independent of a GPS signal. Thus, when GPS is not available, the imaging or vision aiding system can reduce the free inertial navigation drift.

In one specific example, the system correlates onboard infrared (IR) camera images having two-dimensional (2D) features with a reference visible band map. After correlating between the onboard IR camera images and the visible band map, the system can transfer the 3D location from the visible map to the 2D IR image feature location. Electrical optical (EO) sensors can be employed to acquire infrared images. In EO sensor based navigation, the system assumes that there is an external 2D visible image database associated with a 3D reference map. This 3D reference map can be built on top of a visible camera image database (e.g., USGS database of visible images). Thus, the reference map has both 2D (image pixel) and 3D (lat., long., and elevation) information embedded therein.

The onboard camera data collection system can be an IR camera, which is the source of imagery for the vision-based portion of the navigation system. For example, under cloudy conditions, only infrared data may be detected by the vision-based portion. In particular, a distributed aperture system (DAS) sensor provides imagery in the infrared band which can be captured from 360 degrees onboard an aircraft or ground vehicle, for example. Since the 3D reference map data is available in the visible band, the systems and methods described herein perform cross-spectral extraction and correlation of features between images generated in the visible and the IR band, for example. After correlation between the onboard IR camera images and the visible band map, the feature pixel location in the 2D onboard IR system can be associated with a 3D geo-location (e.g., latitude, longitude, and elevation) through the cross spectral feature matching. This 3D geo-location data can then be used to perform a navigation solution update for the navigation system.

Figure 1:
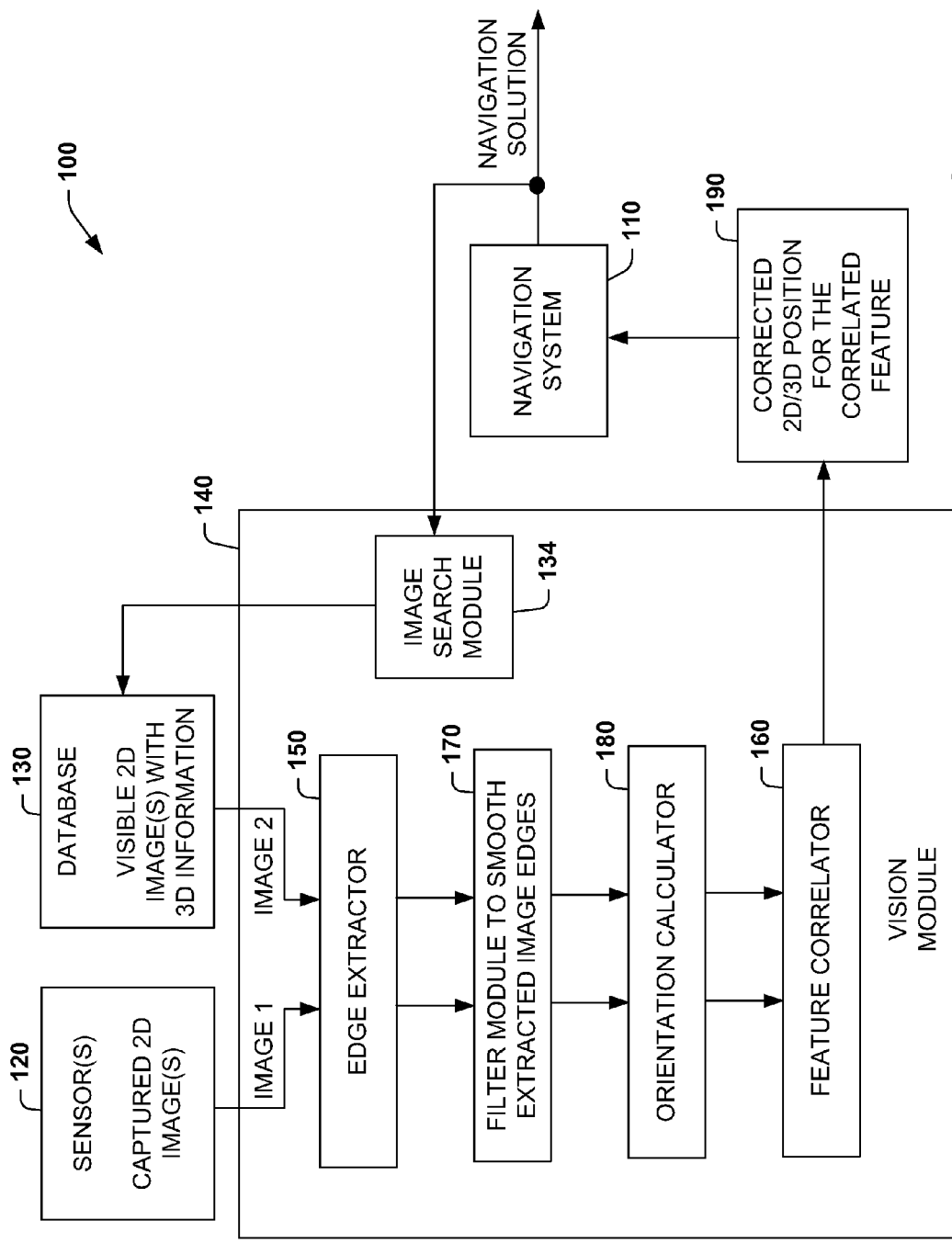
FIG. 1 illustrates an example of a system to adjust a navigation system via cross spectral feature correlation between images having different spectral content.

FIG. 1 illustrates an example of a system 100 to adjust a navigation system 110 via cross spectral feature correlation between images having different spectral content. The system 100 includes a sensor 120 (or sensors) to generate a first image IMAGE1 having a first two-dimensional image pixel data set. A database 130 provides a second image IMAGE2 having a second two-dimensional image pixel data set that includes a three-dimensional geo-location data set describing a geo-location (e.g., latitude, longitude, and elevation) of each pixel in the second two-dimensional image pixel data set. The database 130 can reside onboard an aircraft or ground vehicle and/or can be accessed remotely over a communication network, for example. The database 130 can cover a large area, such as the whole continental US data. The first act is to find which region in the database 130 will be compared with the onboard sensor's IR image. The second IMAGE2 (candidate region image) can be extracted from the database 130 via an image search module 134 by knowing general positional coordinates from the navigation system 110. The general coordinates can be employed in a k-dimensional (KD) search by the image search module 134 (See e.g., FIG. 5 below) to retrieve IMAGE2 which is generally near (e.g., with error) the coordinates where IMAGE1 was captured.

A vision module 140 includes an edge extractor 150 to extract image edge information from the first two-dimensional pixel data set and image edge features from the second two-dimensional image pixel data set. The vision module 150 includes a feature correlator 160 to determine a navigational position for each pixel in the first two-dimensional data set based on an image edge feature comparison of the extracted edge features from the first and second two-dimensional image pixel data sets. The feature correlator 160 assigns a subset of the three-dimensional positional data set from the second image IMAGE2 to a subset of correlated features in the first image IMAGE1 based on the image edge feature comparison. In one example, the first image IMAGE1 can be captured from an infrared frequency sensor 120 and the second image IMAGE2 can be stored in the database 130 from a visible frequency sensor (not shown).

The edge extractor 150 performs a gradient operation and identifies edge point pixel positions of the first and second image by selecting gradient magnitudes above a predetermined threshold to identify the edge point pixel positions. The gradient operation includes applying a gradient operator that includes at least one of a Roberts operator, a Prewitt operator, a Sobel operator, and an Isotropic operator, for example. A filter 170 transforms extracted edge features from the first and second image pixel data sets into a first smooth image domain and a second smooth image domain. As used herein the term smooth refers to a blurring of features in images. For example, highway features in an infrared image may be of a different thickness than highway features of the visible images and the smoothing allows for more accurate comparisons between images.

In one specific example, the filter 170 performs a Gaussian filter to transform the extracted edge features from the first and second image pixel data sets into the first smooth image domain and a second smooth image domain. An orientation calculator 180 employs a histogram to determine an orientation between edge features of the first smooth image domain and the second smooth image domain. As used herein, the term histogram refers a representation of the distribution of numerical data. It is an estimate of the probability distribution of a continuous variable (quantitative variable). To construct a histogram, the first step is to "bin" the orientation of values—that is, divide the entire orientation of values into a series of small intervals and then count how many values fall into each interval. A rectangle is drawn with height proportional to the count and width equal to the bin size, so that rectangles align with each other. A histogram may also be normalized displaying relative frequencies.

The feature correlator 160 computes a distance between the histogram of the oriented edge features of the first and second smooth image domains for a subset of pixels in the first image pixel data set based on the computed distance to a subset of the second image pixel data set. The feature correlator 160 then ranks the computed distance between the oriented edge features of the first and second smooth image domains and determines a navigational position for a subset of pixels in the first image pixel data set based on the ranking in order to extract the three-dimensional geo-location data associated with the second image pixel data set. The navigational system 110 then receives the corrected 2D/3D (geo-located) position at 190 for the correlated feature to correct a navigation solution for the navigational system. A warping module (See e.g., FIG. 2) can be employed to change the angular prospective of the first image IMAGE1 from about a 45 degree prospective view to a top-down view of the first image before the edge extractor 150 begins processing.

As noted above, the system and methods described herein can be employed for adjusting the navigational system 110 of a vehicle (e.g., aircraft or ground vehicle) for drift based on cross-spectral matching of features from, for example, infrared (IR) images with visible images. The system 110 utilizes the IR sensor 120 for capturing an IR image of a given scene (e.g., an aerial view of a geographical location) and the database 130 for storing a plurality of visible images (e.g., United States Geological Survey Images (USGS) of geographical locations), wherein one of the plurality of images corresponds to a visible image of the given scene. The plurality of visible images stored in the database 130 have two-dimensional (2-D) visible pixel information (image intensity data) and associated three-dimensional (3-D) information (latitudinal, longitudinal and elevation data) characterizing each given pixel of each visible image.

The system 100 includes the image search module 134 for locating the visible image of the scene from the plurality of visible images in the database 130. Although shown within the vision module 140, the image search module 134 can be located remotely from the vision module. The image search module 134 provides the visible image IMAGE2 to the vision module 140 which is configured to receive the visible image. The vision module 140 utilizes the visible and IR images of the given scene to derive 3-D information for prominent pixels location of the features of the IR image based on the 3-D information of prominent pixels of the visible image according to a cross-spectral feature correlation as described herein.

In one example, the cross-spectral feature correlation is an edge domain feature matching in the visible and IR images of the scene comprising the edge extractor 150 (a prominent pixel identification method) and a spectral-matching (SM) method via the feature correlator 160. The edge extractor 150 includes generating gradient images of the visible and IR images based on a common gradient operator (e.g., a Sobel Operator), comparing gradient values of each respective pixel of each gradient image to a pre-determined threshold value to identify pixels (the prominent pixels) within the gradient images that experience greatest value changes, and generating binary edge images based on the pixels identified in each gradient image that experience the greatest value changes. This includes employing a Gaussian smoothing filter 170 to blur (smooth) each respective binary edge image to increase a visible thickness of edges depicted within each binary edge image and to generate a smooth binary edge image (SBEI) of the visible and IR image.

The spectral-matching (or spectral correlation) employed by the feature correlator 160 comprises (i) computing an orientation histogram via the orientation calculator 180 for each respective pixel of each SBEI according to a respective image descriptor. The feature correlator 160 further includes (ii) computing distances between orientation histograms of each pixel of the SBEI of the IR image and candidate pixels (e.g., a portion or all of the pixels) of the SBEI of the visible image, (iii) associating (pairing) each pixel of the SBEI of the IR image with a given candidate pixel according to a computed distance between the two to generate a plurality of pixel pairs, (iv) ranking the plurality pixel pairs based on the computed distances, selecting a given percentage of the plurality pixel pairs (e.g., top 20%) and comparing the selected given percentage to a pre-defined threshold value to identify matched pixel pairs (matched/correlated features) that exhibit a highest degree of confidence.

The vision module 140 can be configured to determine 3-D information for respective pixels of the matched pixel pairs corresponding to pixel location of the features of the IR image based on the 3D information associated with a respective pixel location of the features at the visible image that the respective pixels are paired with. The vision module 140 can be further configured to transmit the 3D geo-location of the pixels of the visible band to the pixel location of the features at the IR image to a Kalman filter (See e.g., FIG. 3) for adjusting the navigational system 110 for the drift.

Figure 2:
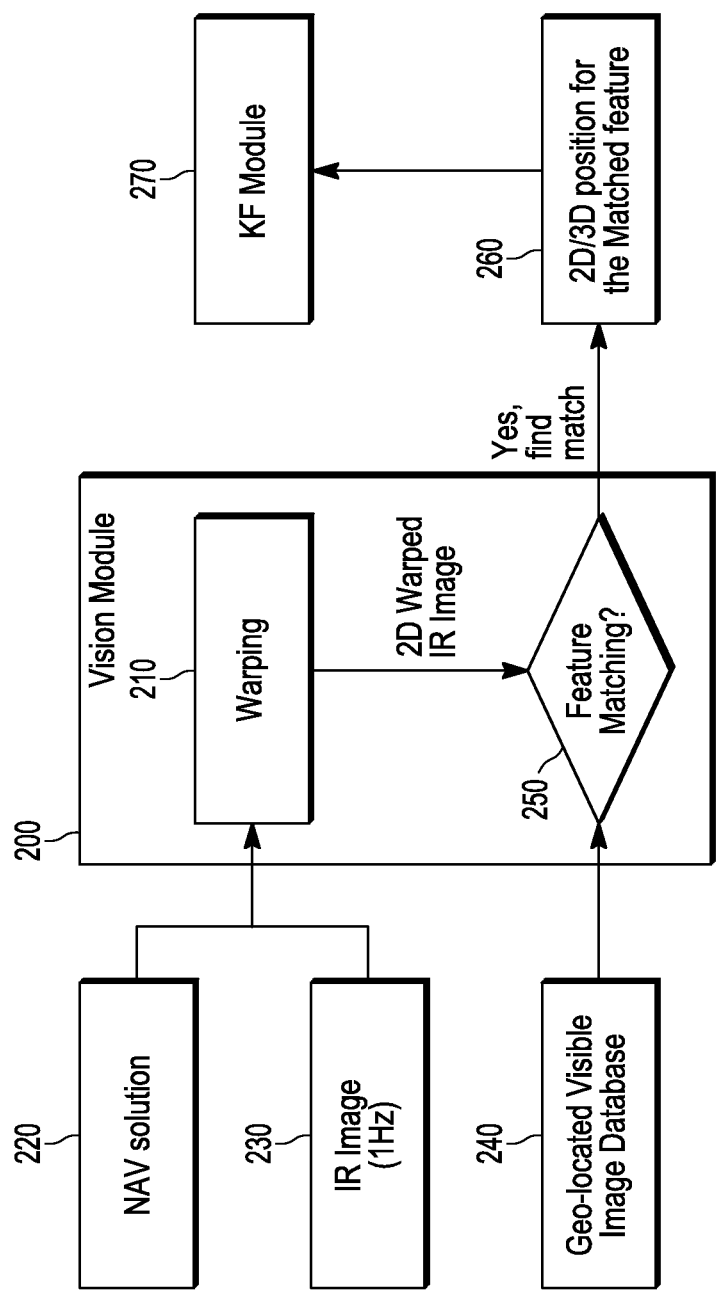
FIG. 2 illustrates an example of a vision module to adjust a navigation system via cross spectral feature correlation between images having different spectral content.

FIG. 2 illustrates an example of a vision module 200 to adjust a navigation system via cross spectral feature correlation between images having different spectral content. As shown, the vision module includes a warping module 210 that receives data from a navigation solution 220 and an IR image 230 (e.g., captured at 1 Hertz frequency). If the visible image is a top down view image, the first processing action is to warp the IR image at 210 to change the IR image acquired from the 45 degree prospective angle to a top down view IR image. A visible image from database 240 has both 2D image pixel information and the 3D latitude, longitude and elevation information. After the warping 210, feature matching (or correlation) is performed at 250 between the top down vie IR image versus the top down visible camera image from database 240. As noted previously, the feature matching method can be applied to map IR and visible image to some common domain for feature matching such as the edge domain. As shown, after feature matching at 250, 2d/3D position is generated for the matched features at 260 that can then be applied to a Kalman Filter (KF) at 270 which is utilized to correct the navigation system. A navigation system utilizing the Kalman Filter 270 is illustrated and described below with respect to FIG. 3.

Figure 3:
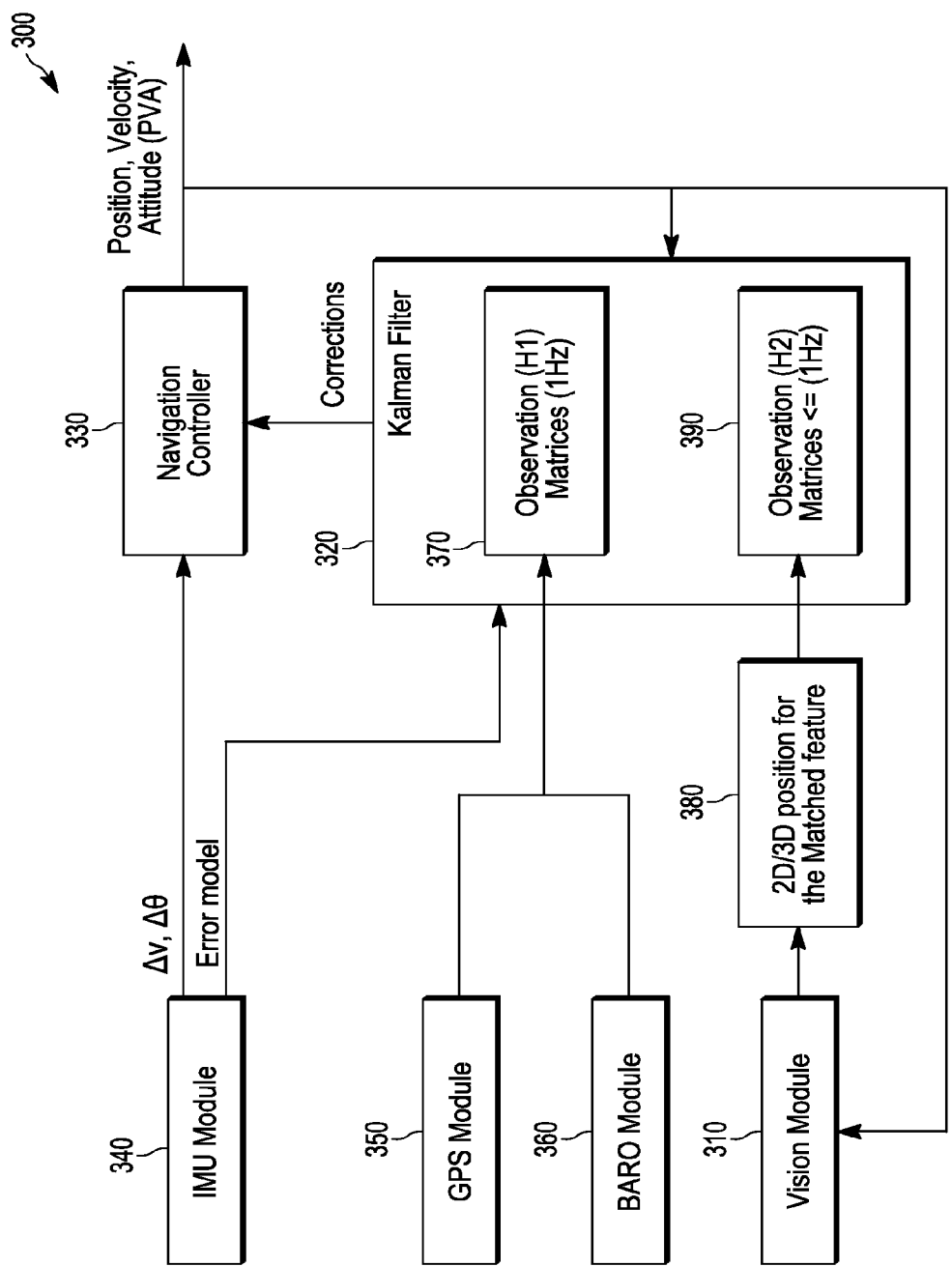
FIG. 3 illustrates an example of a navigation system that is adjustable via a vision module that employs cross spectral feature correlation between images.

FIG. 3 illustrates an example of a navigation system 300 that is adjustable via a vision module 310 that employs cross spectral feature correlation between images. The system 300 includes a Kalman Filter 320 that issues navigational corrections to a navigation controller 330. The navigation controller 330 generates position, velocity, and attitude information to be used for vehicle control. The controller receives velocity and angular data from an inertial measurement unit 340 which also provides an error model output to the Kalman Filter 320. Inputs to the Kalman Filter 320 can include global positioning data from GPS module 350 and altimeter data from barometric altimeter 360. Data from the GPS 350 and altimeter 360 can be processed via observational matrices 370 in the Kalman Filter 320. As shown, corrected 2D/3D matched feature position data 380 is generated by the vision module 310 to adjust the Kalman Filter 320 via observation matrices 390. As the corrected position data 380 is fed to the Kalman Filter 320, corrected position information is provided to the navigation controller 330 to adjust its respective navigation solution output.

Figure 4:
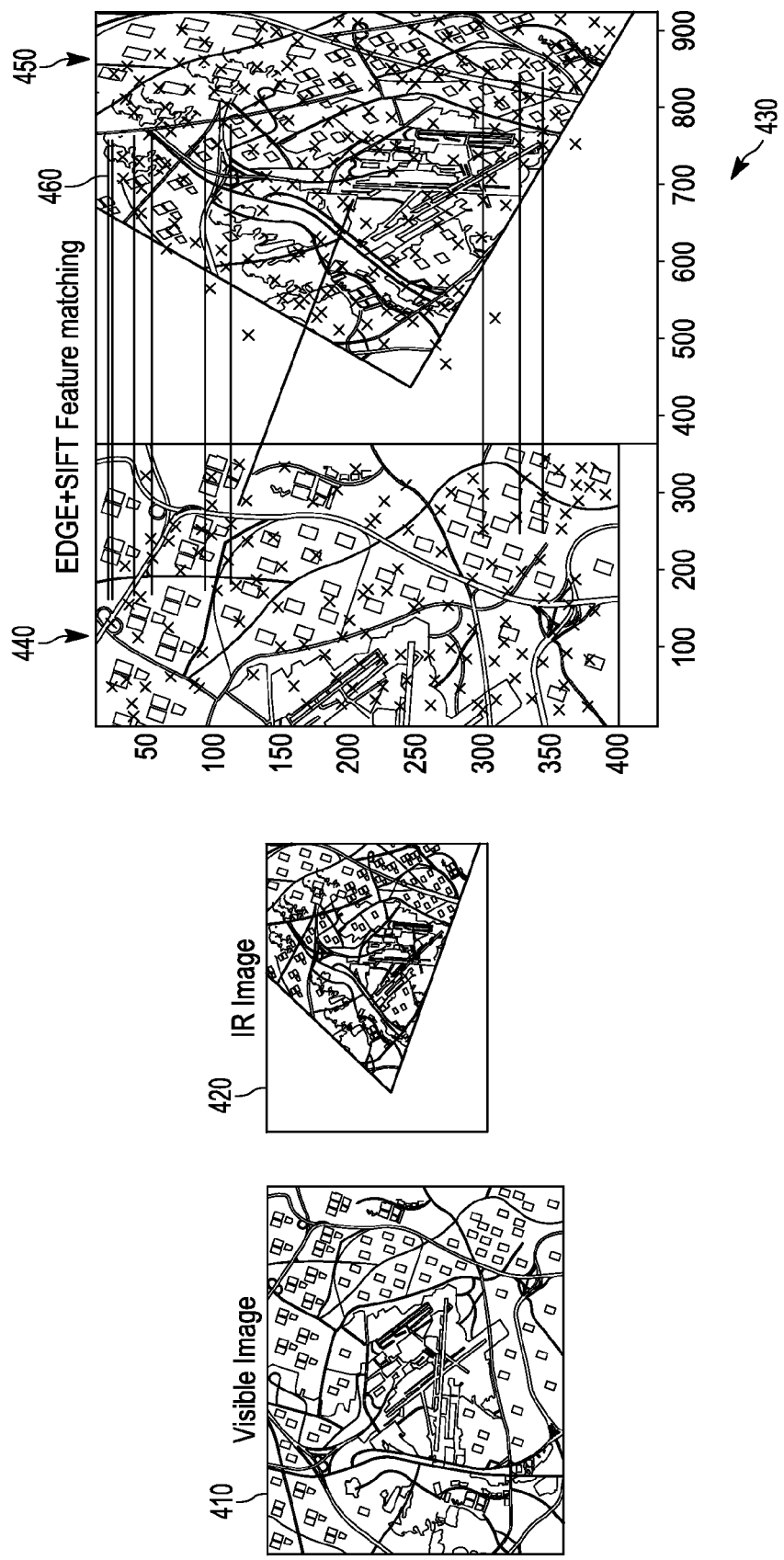
FIG. 4 illustrates an example of correlated image edge features between a visible image and an infrared image.

FIG. 4 illustrates an example of correlated image edge features between a visible image 410 and an infrared (IR) image 420. The image 410 was retrieved from a database of images having 2D visible pixel information, where each pixel is associated with 3D latitude, longitude, and elevation data, for example. The IR image 420 represents a warped view that has been captured from an onboard IR sensor. As shown in an output diagram 430, blurred edge features at 440 representing the visible image 410 are correlated with blurred edge features at 450 representing the IR image 420. For example, a matching line 460 shows where a blurred edge feature at 440 is correlated with a blurred edge feature at 450. As points are correlated or matched between as described herein, 3D position information from the visible image can be extracted to correct the navigation system that is guided from a sensor such as an infrared sensor, for example. A plurality of such matching points between images at 440 and 450 can be similarly determined.

Figure 5:
FIG. 5 illustrates example of database images that are aligned to a grid and can be searched to correlate with captured infrared images.

FIG. 5 illustrates example of database images 500 that are partitioned into a grid and can be searched to correlate with captured infrared images. The database of images 500 can be aligned with a searching grid where each grid location within the images can be associated with a central searching point. For example, a grid location at 510 can encompass a visible viewing area of a predetermined dimension (e.g., 100×100 meters). Each grid location can be assigned the searching point at the respective center of each grid, where the searching point is searched to find the image in the database that is closest to the present position of the navigational system. As noted previously, a k-dimensional (KD) tree can be employed to search the database 500 of visible image to locate the grid or several grids closest to the present vehicle position and covariance of the position as determined by the current navigation system solution which may be in error due to drift as previously described. After the grid 510 is located, a captured infrared image at 520 can be compared with the grid's visible image. After the visible image grid at 510 and infrared image have been generally aligned based on current navigational coordinates, the edge detection, filtering, histogram orientations, and feature correlation as previously described can be employed to determine more precise 3D position information for the captured 2D infrared image at 520.

Figure 6:
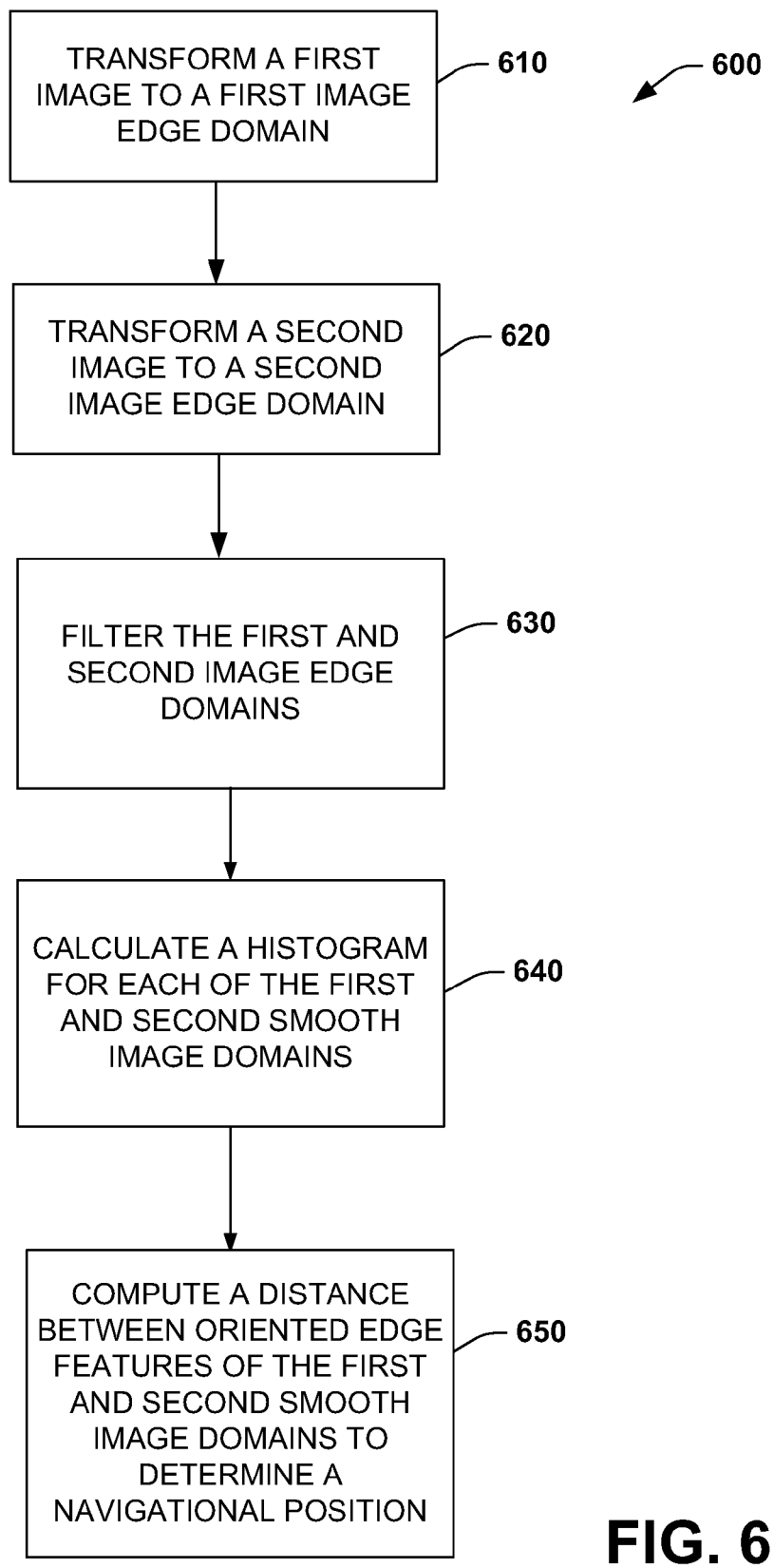
FIG. 6 illustrates an example of a method to adjust a navigation system via cross spectral feature correlation between images having different spectral content.
Figure 7:
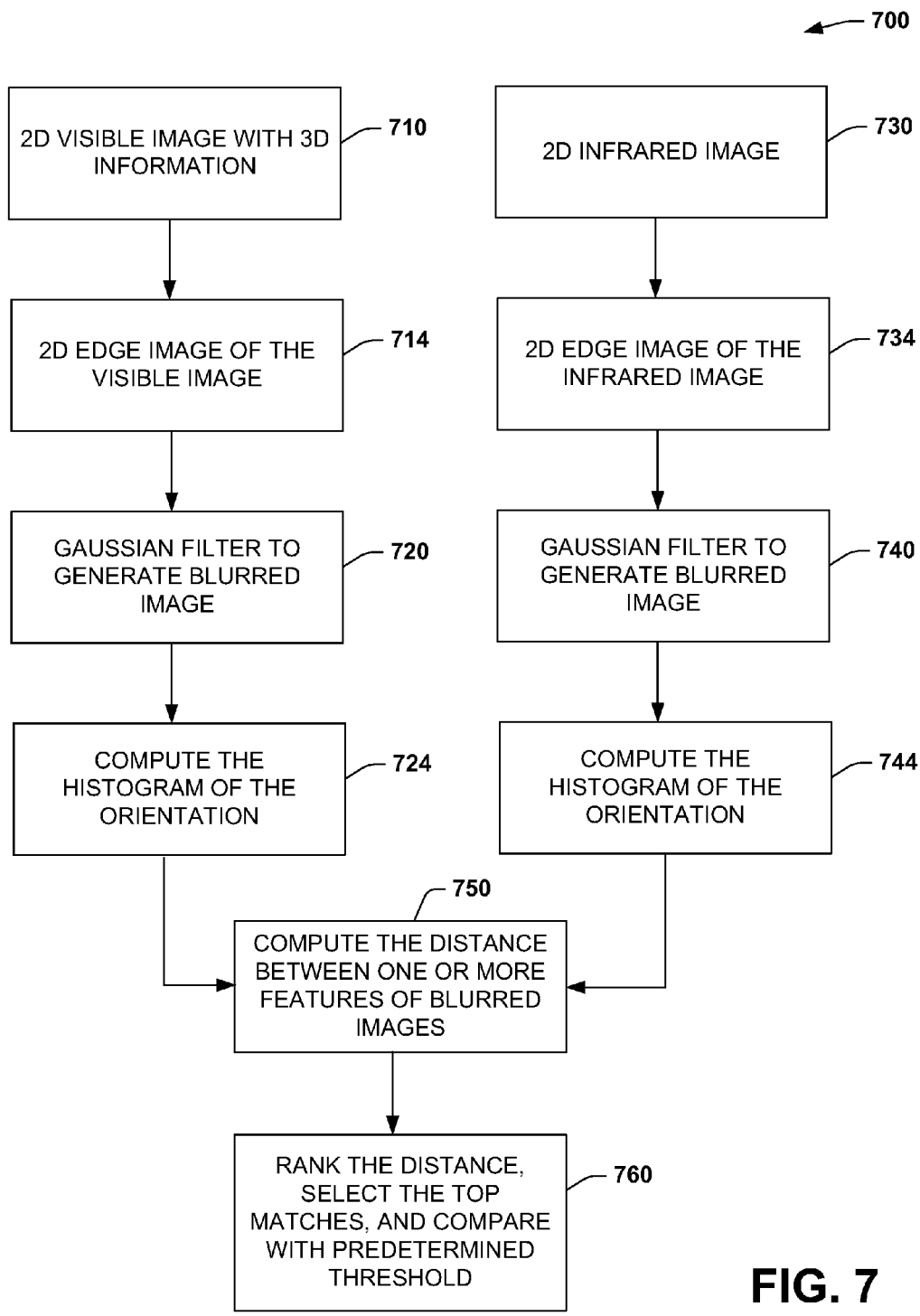
FIG. 7 illustrates an example of a parallel processing method to adjust a navigation system via cross spectral feature correlation between images having different spectral content.

In view of the foregoing structural and functional features described above, example methods will be better appreciated with reference to FIGS. 6 and 7. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured in an IC or a processor, for example.

FIG. 6 illustrates an example of a method 600 to adjust a navigation system via cross spectral feature correlation between images having different spectral content. At 610, the method 600 includes transforming a first image pixel data set to a first image edge domain (e.g., via edge extractor 150 of FIG. 1). At 620, the method 600 includes transforming a second image pixel data set to a second image edge domain (e.g., via edge extractor 150 of FIG. 1). Each pixel in the second image pixel data set is associated with three-dimensional position data. At 630, the method 600 includes filtering the first and second image edge domains to transform the first and second image edge domains into a first smooth image domain and a second smooth image domain (e.g., via filter 170 of FIG. 1). At 640, the method 600 includes calculating a histogram for each of the first and second smooth image domains to determine an orientation between the first and second smooth image domains (e.g., via orientation calculator 180 of FIG. 1). At 650, the method 600 includes computing a distance between the histogram of the oriented edge features of the first and second smooth image domains to determine a navigational position for a subset of pixels in the first image pixel data set based on a correlation to the second image pixel data set in order to extract the three-dimensional position data associated with the second image pixel data set (e.g., via feature correlator 160 of FIG. 1).

Although not shown, the method 600 can also include performing a gradient operation and identifying edge point pixel positions of the first and second image by selecting gradient magnitudes above a predetermined threshold to identify the edge point pixel positions. The gradient operation can include applying a gradient operator that includes at least one of a Roberts operator, a Prewitt operator, a Sobel operator, and an Isotropic operator, for example. The method 600 can also include performing a Gaussian filter to transform the extracted edge features from the first and second image pixel data sets into the first smooth image domain and a second smooth image domain. The method 600 can include ranking the computed distance between the oriented edge features of the first and second smooth image domains and determining a navigational position for a subset of pixels in the first image pixel data set based on the ranking in order to extract the three-dimensional position data associated with the second image pixel data set. The method 600 can also include updating a navigational system with the navigational position to correct a navigation solution for the navigational system.

FIG. 7 illustrates an example of a parallel processing method 700 to adjust a navigation system via cross spectral feature correlation between images having different spectral content. Beginning at 710, the method 700 includes visible image processing. At 710, the method acquires a 2D visible image having 3D position information associated therein. For example, each pixel in the 2D visible image can have latitude, longitude, and altitude data (e.g., in a separate memory location associated with the pixel) associated with the pixel intensity data of the pixel. At 714, the method 700 includes extracting a 2D edge image of the visible image as previously described. At 720, the method 700 includes employing a Gaussian filter to generate a blurred image of the visible image. At 724, the method 700 includes computing a histogram of the orientation of the blurred visible image.

Beginning at 730 another processing path of the method 700 includes infrared image processing. At 730, the method acquires a 2D infrared image. At 734, the method 700 includes extracting a 2D edge image of the infrared image as previously described. At 740, the method 700 includes employing a Gaussian filter to generate a blurred image of the infrared image. At 744, the method 700 includes computing a histogram of the orientation of the blurred (or smoothed) infrared image.

Output from the histogram computations as 724 and 744 respectively is processed at 750 of the method 700. At 750, a distance is computed between one or more of the image edge features of the blurred visible image with respect to the blurred image edge features of the infrared image. Distances can be determined by counting pixels separating the respective features, for example. At 760, the method 700 includes ranking the computed distances from 750 (e.g., top 20 closest distances), selecting the top matches (or correlations) between edge features, and comparing the distance to a predetermine threshold to determine if edge features from the visible image are matched (e.g., substantially the same or correlated) with edge features from the infrared image. For the correlated features, the 3D information associated with the visible image is then extracted and assigned to the correlated edge feature of the infrared image. The correlated 3D information can then be employed to update a navigation system to correct its navigation solution. For example, a solution that has drifted over 100 meters from its expected coordinates can be corrected to within about +/−3 meters (or less depending on image database accuracy) via the cross-spectral correlation described herein.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a sensor to generate a first image having a first two-dimensional image pixel data set;
   a database to provide a second image having a second two-dimensional image pixel data set that includes a three-dimensional positional data set describing a navigational position of each pixel in the second two-dimensional image pixel data set; and
   a vision module comprising:
   an edge extractor to extract image edge features from the first two-dimensional pixel data set and image edge features from the second two-dimensional image pixel data set; and
   a feature correlator to determine a navigational position for each pixel in the first two-dimensional data set based on an image edge feature comparison of the extracted edge features from the first and second two-dimensional image pixel data sets, wherein the feature correlator assigns a subset of the three-dimensional positional data set from the second image to a subset of correlated features in the first image based on the image edge feature comparison.

2. The system of claim 1, wherein the first image is captured from an infrared frequency sensor and the second image is stored in the database from a visible frequency sensor.

3. The system of claim 1, wherein the edge extractor performs a gradient operation and identifies edge point pixel positions of the first and second image by selecting gradient magnitudes above a predetermined threshold to identify the edge point pixel positions.

4. The system of claim 3, wherein the gradient operation includes applying a gradient operator that includes at least one of a Roberts operator, a Prewitt operator, a Sobel operator, and an Isotropic operator.

5. The system of claim 1, further comprising a filter to transform extracted edge features from the first and second image pixel data sets into a first smooth image domain and a second smooth image domain.

6. The system of claim 5, wherein the filter performs a Gaussian filter to transform the extracted edge features from the first and second image pixel data sets into the first smooth image domain and a second smooth image domain.

7. The system of claim 6, further comprising an orientation calculator that employs a histogram to determine an orientation between edge features of the first smooth image domain and the second smooth image domain.

8. The system of claim 7, wherein the feature correlator computes a distance between the histogram of the oriented edge features of the first and second smooth image domains for a subset of pixels in the first image pixel data set based on the computed distance to a subset of the second image pixel data set.

9. The system of claim 8, wherein the feature correlator ranks the computed distance between the oriented edge features of the first and second smooth image domains and determines a navigational position for a subset of pixels in the first image pixel data set based on the ranking in order to extract the three-dimensional position data associated with the second image pixel data set.

10. The system of claim 9, further comprising a navigational system that receives the navigational position to correct a navigation solution for the navigational system.

11. The system of claim 1, further comprising a warping module to change the angular prospective of the first image from about a 45 degree prospective view to a top-down view of the first image.

12. A method, comprising:
    transforming a first image pixel data set, via a processor, to a first image edge domain,
    transforming a second image pixel data set, via the processor, to a second image edge domain, wherein each pixel in the second image pixel data set is associated with three-dimensional position data;
    filtering the first and second image edge domains, via the processor, to transform the first and second image edge domains into a first smooth image domain and a second smooth image domain;
    calculating, via the processor, a histogram for each of the first and second smooth image domains to determine an orientation between the first and second smooth image domains; and
    computing a distance, via the processor, between the histograms of the oriented edge features of the first and second smooth image domains to determine a navigational position for a subset of pixels in the first image pixel data set based on a correlation to the second image pixel data set in order to extract the three-dimensional position data associated with the second image pixel data set.

13. The method of claim 12, further comprising performing a gradient operation and identifying edge point pixel positions of the first and second image by selecting gradient magnitudes above a predetermined threshold to identify the edge point pixel positions.

14. The method of claim 13, wherein the gradient operation includes applying a gradient operator that includes at least one of a Roberts operator, a Prewitt operator, a Sobel operator, and an Isotropic operator.

15. The method of claim 12, further comprising performing a Gaussian filter to transform the extracted edge features from the first and second image pixel data sets into the first smooth image domain and a second smooth image domain.

16. The method of claim 12, further comprising ranking the computed distance between the histogram of the oriented edge features of the first and second smooth image domains and determining a navigational position for a subset of pixels in the first image pixel data set based on the ranking in order to extract the three-dimensional position data associated with the second image pixel data set.

17. The method of claim 16, further comprising updating a navigational system with the navigational position to correct a navigation solution for the navigational system.

18. A non-transitory computer readable medium having computer executable instructions stored thereon, the computer executable instructions configured to:
   transform an infrared image pixel data set from a sensor to a first image edge domain,
   transform a visual image pixel data set from a database to a second image edge domain, wherein each pixel in the visual image pixel data set is associated with three-dimensional position data;
   filter the first and second image edge domains to transform the first and second image edge domains into a first smooth image domain and a second smooth image domain;
   calculate a histogram for each of the first and second smooth image domains to determine an orientation between the first and second smooth image domains; and
   compute a distance between the histograms of the oriented edge features of the first and second smooth image domains to determine a navigational position for a subset of pixels in the infrared image pixel data set based on a correlation to the visual image pixel data set in order to extract the three-dimensional position data associated with the visual image pixel data set.

19. The non-transitory computer readable medium of claim 18, further comprising computer executable instructions to perform a gradient operation and identify edge point pixel positions of the first and second image by selecting gradient magnitudes above a predetermined threshold to identify the edge point pixel positions.

20. The non-transitory computer readable medium of claim 19, further comprising computer executable instructions to perform a Gaussian filter to transform the first and second image edge domains into a first smooth image domain and a second smooth image domain.

* * * * *